United States Patent
Guo et al.

(10) Patent No.: US 9,338,740 B2
(45) Date of Patent: May 10, 2016

(54) METHOD AND APPARATUS FOR SELECTING A WIRELESS ACCESS POINT

(75) Inventors: Katherine H. Guo, Scotch Plains, NJ (US); Thomas Woo, Short Hills, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 395 days.

(21) Appl. No.: 13/551,894

(22) Filed: Jul. 18, 2012

(65) Prior Publication Data

US 2014/0022918 A1 Jan. 23, 2014

(51) Int. Cl.
| | | |
|---|---|---|
| H04W 48/20 | (2009.01) | |
| H04W 24/08 | (2009.01) | |
| H04W 36/24 | (2009.01) | |
| H04W 36/30 | (2009.01) | |
| H04W 92/10 | (2009.01) | |
| H04W 92/14 | (2009.01) | |

(52) U.S. Cl.
CPC .............. *H04W 48/20* (2013.01); *H04W 24/08* (2013.01); *H04W 36/245* (2013.01); *H04W 36/30* (2013.01); *H04W 92/10* (2013.01); *H04W 92/14* (2013.01)

(58) Field of Classification Search
None
See application file for complete search history.

(56) References Cited

U.S. PATENT DOCUMENTS

| 2001/0022558 A1* | 9/2001 | Karr et al. ..................... 342/450 |
|---|---|---|
| 2004/0066759 A1* | 4/2004 | Molteni et al. ................ 370/329 |
| 2009/0264123 A1 | 10/2009 | Agashe et al. |
| 2010/0069066 A1* | 3/2010 | Shen et al. ..................... 455/434 |
| 2010/0085947 A1* | 4/2010 | Ringland et al. .............. 370/338 |
| 2010/0128698 A1* | 5/2010 | Ishizu et al. ................... 370/332 |
| 2010/0226339 A1* | 9/2010 | Stephenson et al. .......... 370/332 |
| 2012/0039181 A1* | 2/2012 | Aziz et al. ..................... 370/241 |
| 2012/0196644 A1* | 8/2012 | Scherzer et al. .............. 455/524 |

FOREIGN PATENT DOCUMENTS

| JP | 2005051661 A | 2/2005 |
|---|---|---|
| WO | 2009029157 A1 | 3/2009 |
| WO | 2010037128 A1 | 4/2010 |

OTHER PUBLICATIONS

Visa Holopainen et al: "End to End Principle in Access Point Selection", World of Wireless, Mobile and Multimedia Networks, 2007. WOWMOM 2007. IEEE International Symposium on A, IEEE, PI, Jun. 1, 2007, pp. 1-6.

Biljana Bojovic et al: "A supervised learning approach to Cognitive Access Point Selection", Globecom Workshops (GC WKSHPS), 2011 IEEE, IEEE, Dec. 5, 2011, pp. 1100-1105.

PCT Notification of Transmittal of the International Search Report and Written Report for PCT/US2013/049181, mailed Oct. 10, 2013.

\* cited by examiner

*Primary Examiner* — Ian N Moore
*Assistant Examiner* — Brian T Le
(74) *Attorney, Agent, or Firm* — Carl Bilicska

(57) ABSTRACT

Various embodiments provide a method and apparatus of providing wireless access point selection based on performance metric(s) and signal strength. In particular, a client selecting between one of a number of wireless access points bases the selection decision on performance metrics as well as signal strength.

14 Claims, 6 Drawing Sheets

400

500

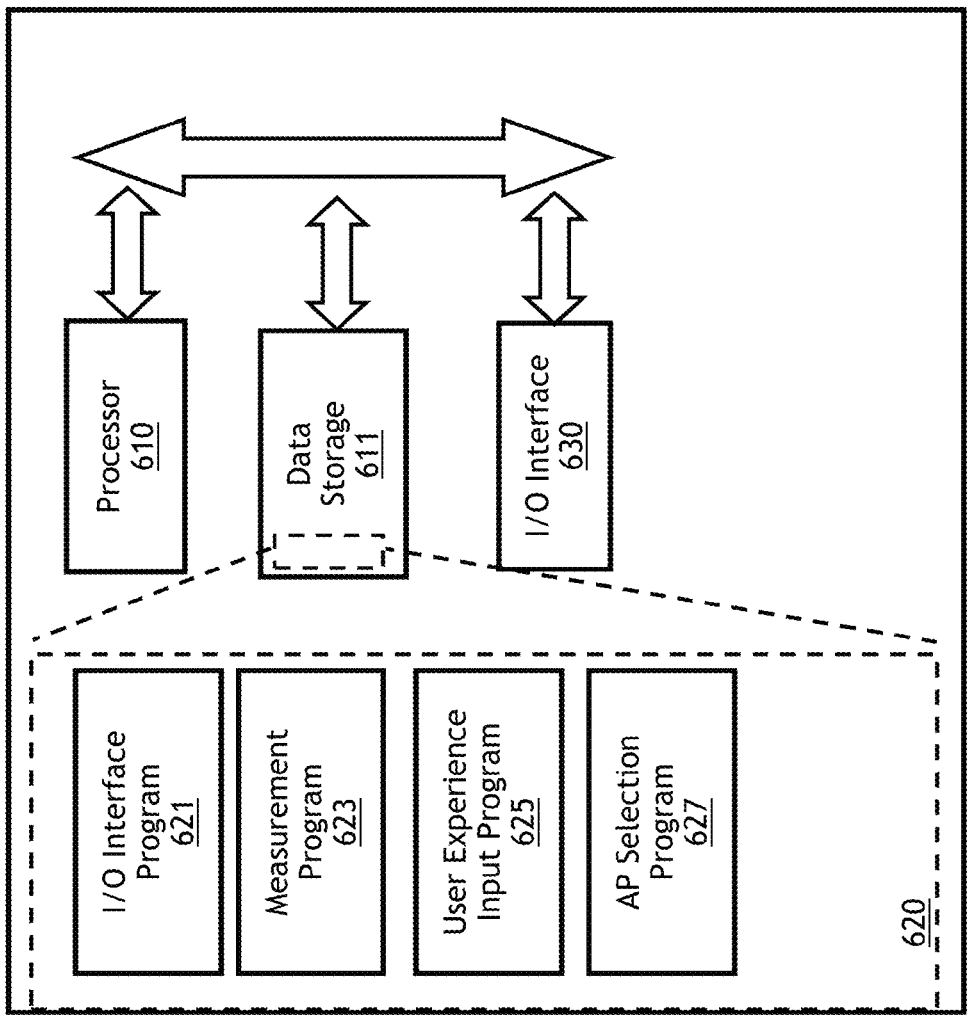

METHOD AND APPARATUS FOR SELECTING A WIRELESS ACCESS POINT

TECHNICAL FIELD

The invention relates generally to methods and apparatus for providing wireless access point (AP) selection.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known wireless systems, a client device selects the wireless AP offering the best signal strength from a list of available wireless APs.

SUMMARY OF ILLUSTRATIVE EMBODIMENTS

Various embodiments provide a method and apparatus of providing wireless access point selection based on performance metric(s) and signal strength. Advantageously, improved traffic throughput and improved end-to-end performance may be obtained by basing wireless access point selection on performance metric(s) in addition to signal strength.

In one embodiment, an apparatus is provided for selecting a wireless access point. The apparatus includes a data storage and a processor communicatively connected to the data storage. The processor is programmed to: determine a plurality of wireless access points available to the apparatus; determine a plurality of signal strengths, the plurality of signal strengths comprising signal strengths between the apparatus and each of the plurality of available wireless access points; determine a plurality of historical performance metrics associated with at least two of the plurality of available wireless access points; and select the wireless access point from the plurality of wireless access points based on the plurality of historical performance metrics and the plurality of signal strengths.

In some of the above embodiments, the plurality of historical performance metrics are based on a current time of day range or a day of the week.

In some of the above embodiments, the determination of the plurality of historical performance metrics includes programming the processor to retrieve the plurality of historical performance metrics from a performance database.

In some of the above embodiments, the plurality of historical performance metrics includes one-hop performance measurements, backhaul performance measurements, or end-to-end performance measurements.

In some of the above embodiments, the plurality of historical performance metrics includes historical user experience ratings.

In some of the above embodiments, the plurality of historical performance metrics are based on a plurality of (signal strength, wireless AP) pairs. Where the (signal strength, wireless AP) pairs correspond to the plurality of current signal strengths between the apparatus and each of the plurality of wireless access points.

In some of the above embodiments, the plurality of historical performance metrics are based on a plurality of (signal strength, wireless AP, measurement server) tuples. Where the (signal strength, wireless AP, measurement server) tuples correspond to the plurality of current signal strengths between the apparatus and each of the plurality of wireless access points.

In some of the above embodiments, the selection of the wireless access point includes programming the processor to select the wireless access point based on the wireless access point having an associated maximum performance metric in the plurality of historical performance metrics.

In some of the above embodiments, the processor is further programmed to: associate the apparatus with the selected wireless access point; measure a one-hop performance metric between the apparatus and the selected wireless access point; and report the one-hop performance metric to a performance database.

In some of the above embodiments, the processor is further programmed to: measure an end-to-end performance metric between the apparatus and a measurement server; and report the end-to-end performance metric to the performance database.

In a second embodiment, an apparatus is provided for measuring a plurality of performance metrics. The apparatus includes a data storage, and a processor communicatively connected to the data storage. The processor is programmed to: determine an occurrence of a performance measurement trigger, where the occurrence of a performance measurement trigger comprises a determination of an association between a client and a wireless AP; based on the occurrence of a performance measurement trigger, measure a performance metrics between the client and the wireless AP or the client and a measurement server; and report the measured performance metric to a performance database.

In some of the above embodiments, the performance metric is a round trip time for small packets, a round trip time for large packets, an uplink throughput or a downlink throughput.

In some of the above embodiments, the measurement of the performance metric comprises passive measurements.

In some of the above embodiments, the measurement of the performance metric includes active measurements.

In a third embodiment, a method is provided for selecting a wireless access point. The method includes: determining a plurality of wireless access points available to the apparatus; determining a plurality of signal strengths, the plurality of signal strengths comprising signal strengths between the apparatus and each of the plurality of wireless access points; determining a plurality of historical performance metrics associated with at least two of the plurality of available wireless access points; and selecting the wireless access point from the plurality of wireless access points based on the plurality of historical performance metrics and the plurality of signal strengths.

In some of the above embodiments, determining the plurality of historical performance metrics includes retrieving, by the processor in cooperation with the data storage, the plurality of historical performance metrics from a performance database.

In some of the above embodiments, the plurality of historical performance metrics includes one-hop performance measurements, backhaul performance measurements or end-to-end performance measurements.

In some of the above embodiments, the plurality of historical performance metrics comprise historical user experience ratings.

In some of the above embodiments, the plurality of historical performance metrics are based on a plurality of (signal strength, wireless AP) pairs. Where the (signal strength, wireless AP) pairs correspond to the plurality of current signal strengths between the apparatus and each of the plurality of wireless access points.

In some of the above embodiments, the plurality of historical performance metrics are based on a plurality of (signal strength, wireless AP, measurement server) tuples. Where the (signal strength, wireless AP, measurement server) tuples correspond to the plurality of current signal strengths between the apparatus and each of the plurality of wireless access points.

BRIEF DESCRIPTION OF THE DRAWINGS

Various embodiments are illustrated in the accompanying drawings, in which:

FIG. 6 schematically illustrates an embodiment of various apparatus 600 such client 110, one of wireless APs 120 or measurement server 140 of FIG. 1 or client 210, wireless AP 220 or measurement server 240 of FIG. 2.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Various embodiments provide a method and apparatus of providing wireless access point selection based on performance metric(s) and signal strength. Advantageously, by basing wireless access point selection on performance metric(s) in addition to signal strength, the system may improve traffic throughput or end-to-end performance. Moreover, it should be appreciated that by switching to a wireless AP with higher throughput, the time duration for the communication between the client and target server over the network may be shortened thereby reducing battery drain on the client.

Figure 1:
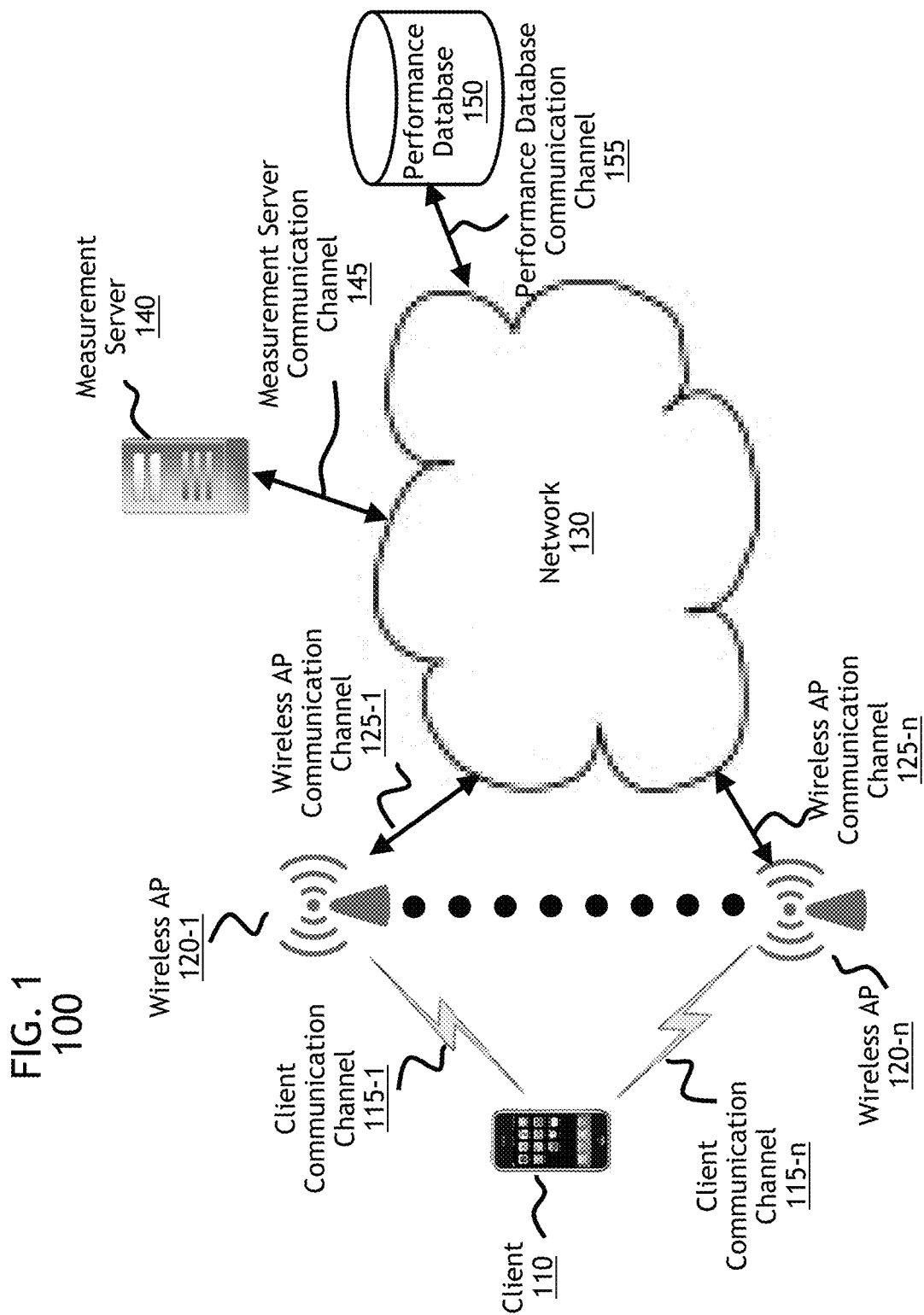
FIG. 1 illustrates an embodiment of a wireless AP selection system 100.

FIG. 1 illustrates an embodiment of a wireless AP selection system 100. The wireless AP selection system 100 includes one or more clients 110 (for purposes of clarity, only one client is shown) accessing network 130 over a communication path. The communication path includes an appropriate one of client communication channels 115-1-115-n (collectively, client communication channels 115), an appropriate one of wireless APs 120-1-120-n (collectively, wireless APs 120), and an appropriate one of wireless AP communication channels 125-1-125-n (collectively, wireless AP communication channels 125). The appropriate one of communications channels 115, wireless APs 120, and wireless AP communication channels 125 are selected based on historic performance metrics stored in performance database 150. Performance database 150 is accessed by a device (e.g., client 110) over network 130 via performance database communication channel 155. Performance metrics include network performance measured between at least two of: client 110; one of wireless APs 120 and measurement server 140. Measurement server 140 is accessed by a device (e.g., client 110 or one of wireless APs 120) over network 130 via measurement server communication channel 145

Client 110 may include any type of communication device(s) capable of associating with one or more of wireless APs 120 and sending or receiving information over network 130 via one or more of client communication channels 115. For example, a communication device may be a thin client, a smart phone, a personal or laptop computer, server, network device, tablet, e-reader or the like. Communication devices may rely on other resources within exemplary system to perform a portion of tasks, such as processing or storage, or may be capable of independently performing tasks. It should be appreciated that while one client is illustrated here, system 100 may include more clients. Moreover, the number of clients at any one time may be dynamic as clients may be added or subtracted from the system at various times during operation.

Wireless APs 120 may include any type of device that allows wireless devices (e.g., client 110) to connect to network 130.

The communication channels 115 support communicating over one or more communication channels such as: wireless communications (e.g., LTE, GSM, CDMA, Bluetooth); WLAN communications (e.g., WiFi); and the like. It should be appreciated that though depicted as a single connection, communication channels 115 may be any number or combinations of communication channels.

The communication channels 125, 145 and 155 support communicating over one or more communication channels such as: wireless communications (e.g., LTE, GSM, CDMA, Bluetooth); WLAN communications (e.g., WiFi); packet network communications (e.g., IP); broadband communications (e.g., DOCSIS, FiOS, and DSL); storage communications (e.g., Fibre Channel, iSCSI) and the like. It should be appreciated that though depicted as a single connection, communication channels 125, 145 and 155 may be any number or combinations of communication channels.

The network 130 includes any number of access and edge nodes and network devices and any number and configuration of links. Moreover, it should be appreciated that network 130 may include any combination and any number of wireless, or wire line networks including: LTE, GSM, CDMA, Local Area Network(s) (LAN), Wireless Local Area Network(s) (WLAN), Wide Area Network (WAN), Metropolitan Area Network (MAN), or the like.

Measurement server 140 serves as a representative server for estimating performance metrics between client 110 and another server connecting to network 130. In particular, measurement server 140 may be any server capable of sending or receiving information over network 130 via measurement server communication channel 145. The performance of communication between client 110 and measurement server 140 serves as an estimation of the end-to-end performance between client 110 and another server (not shown for purposes of clarity) over network 130. Similarly, the performance of the communication between one of the wireless APs 120 and the measurement server 140 serves as an estimation of the backhaul performance between the one of the wireless APs 120 and another server over network 130. It should be appreciated that while only one measurement server is illustrated here, system 100 may include more measurements servers.

Performance database 150 is the persistent store of historic performance metrics required by the wireless AP selection system 100. Performance database 150 may be any suitable storage or memory device and may include any number of storage devices. The included storage device(s) may be (1) distributed; (2) similar or disparate; or (3) may be local to each other or geographically dispersed. It should be appreciated that while one performance database is illustrated here, system 100 may include more storage nodes.

In some embodiments, one or more of wireless APs 120 are WiFi access points.

In some embodiments, in addition to communication channels 115, client 110 supports communication channels (not shown) for sending and receiving information between client 110 and device(s) other than wireless APs 120. For example, to support cellular data offloading in embodiments where the wireless APs 120 are WiFi access points and communication channels 115 are WLAN communication channels, client 110 may include additional wireless communication (e.g., LTE, GSM, CDMA, Bluetooth) channel(s) in order for client 110 to communicate over the wireless (e.g., LTE) network.

In some embodiments, one or more of wireless APs 120 are small cell base stations.

In some embodiments, network 130 is the internet.

In some embodiments, performance database 150 is included in the same apparatus as measurement server 140.

In some embodiments, performance database 150, or a portion thereof, is distributed in client 110. In some of these embodiments, the portion of the performance database 150 contained in client 110 is based on the geographic location of client 110. For example, client 110 may download a portion of performance database 150 containing performance metrics of wireless APs in a geographic region proximate to client 110. Advantageously, client 110 may be capable of performing wireless AP selection programs more efficiently by storing performance metrics of proximate wireless APs. Any suitable threshold may be used to determine proximate wireless APs (e.g., wireless APs within a threshold distance or within city). Furthermore, in some embodiments, the portion of performance database 150 stored in client 110 may be further based on the service provider controlling the wireless AP, a threshold number of wireless APs to download or a threshold size of performance metrics data to download. For example, client 110 may download portions of performance database 150 pertaining to wireless APs within five (5) miles of client 110 where the wireless APs are associated with a service provider (e.g., AT&T) and where client 110 sets a threshold of downloading the most proximate one thousand (1000) wireless APs.

In some embodiments, wireless AP selection system 100 is a portion of a Heterogeneous Network (HetNet). In some of these embodiments, wireless AP selection system 100 is a part of a 3GPP Long-Term Evolution (LTE) Advanced network. In some of these embodiments, client 110 switches to one of wireless APs 120 to implement a data offloading service of an LTE base station (not shown for clarity).

Figure 2:
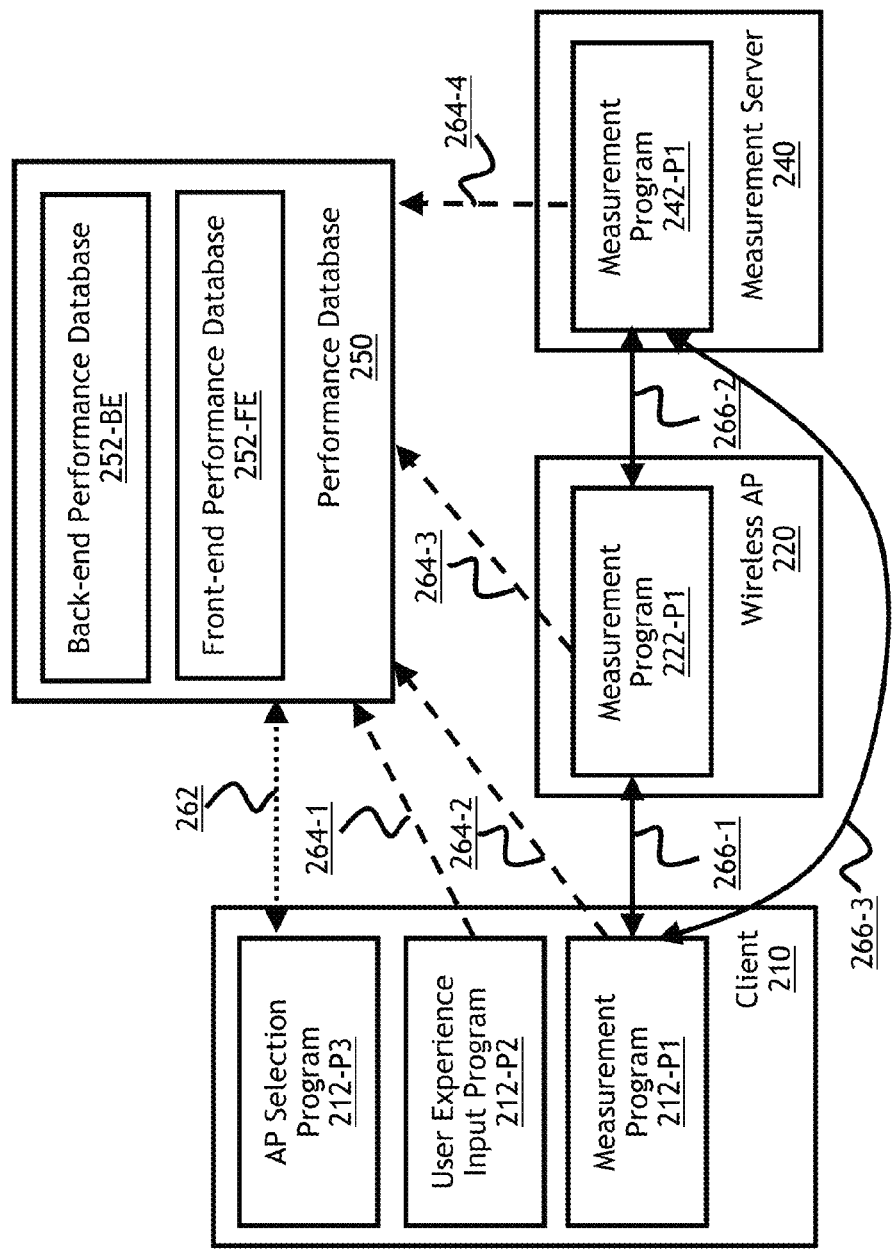
FIG. 2 illustrates a functional block diagram of an embodiment of: client 110 (i.e., client 210), one of wireless APs 120 (i.e., wireless AP 220), measurement server 140 (i.e., measurement server 240) and performance database 150 (i.e., performance database 250) of FIG. 1.

FIG. 2 illustrates a functional block diagram of an embodiment of: client 110 (i.e., client 210), one of wireless APs 120 (i.e., wireless AP 220), measurement server 140 (i.e., measurement server 240) and performance database 150 (i.e., performance database 250) of FIG. 1. Client 210, Wireless AP 220 and measurement server 240 include measurement programs 212-P1, 222-P1 and 242-P1 respectively (collectively, measurement programs P1). Measurement programs P1 measure performance metrics between client 210, wireless AP 220 and measurement server 240 as illustrated by the solid component interaction lines 266-1, 266-2 and 266-3 (collectively, component interactions 266). Optionally, client 210 also includes a user experience input program 212-P2 to collect user perceived performance metrics. Performance metrics are reported to performance database 250 via appropriate ones of the dashed measurement reporting lines 264-1, 264-2, 264-3 and 264-4 (collectively, measurement reporting 264). Performance database 250 optionally includes a back-end performance database 252-BE and a front-end performance database 252-FE to store received performance metrics. Client 210 further includes an AP selection program 212-P3. AP selection program 212-P3 selects a wireless AP (e.g., one of wireless APs 120 of FIG. 1) based on historical performance metrics received from performance database 250 over dotted measurement retrieval line 262.

Measurement programs P1 measure performance metrics between client 210, wireless AP 220 and measurement server 240. Measurements may include: (1) one-hop performance (between a client and a wireless AP as depicted by 266-1); (2) backhaul performance (between the wireless AP and the measurement server as depicted by 266-2); or (3) end-to-end performance (between the client and the measurement server as depicted by 266-3).

Client 210 optionally includes user experience input program 212-P2. User experience input program 212-P2 receives an end user experience rating via an interface provided to a user. In particular, user experience input program 212-P2 allows the user of client 210 to input a rating of the wireless AP based on subjective end user experience. User experience input program 212-P2 maps the inputted rating with the wireless AP (e.g., one of wireless APs 120 of FIG. 1) the client 120 is currently associated with or had been most recently associated with and sends this information to performance database 250 via measurement reporting 264-1. In some embodiments, further information such as the time period client 210 was associated to the mapped wireless AP is sent with the inputted rating and mapped wireless AP.

AP selection program 212-P3 receives historical performance metrics from performance database 250 via measurement retrieval 262 and selects one of a list of available wireless APS (e.g., wireless APs 120 of FIG. 1) based on the retrieved historical performance metrics as described herein.

Performance database 250 may include any suitable storage format and any number or combination of storage or memory devices. In particular, performance database 250 collects and stores any suitable historical information used in determining a wireless AP selection decision such as: (1) performance metrics received from measurement programs P1; (2) a time of day or a day of the week associated with the received performance metrics; or (3) attendant information such as signal strength between the client and wireless AP associated with the received performance metrics. Performance metrics may include any suitable performance metrics such as: (1) round-trip time for large packets (one-hop, backhaul, end-to-end); (2) round-trip time for small packets (one-hop, backhaul, end-to-end); (3) uplink throughput (one-hop, backhaul, end-to-end); (4) downlink throughput (one-hop, backhaul, end-to-end); or (5) end user experience rating (end-to-end performance). It should be appreciated that a time of day or a day of the week may be represented in any suitable format such as one timestamp representing both the time of day and day of the week or as separate time of day and day of the week formats.

Optionally, performance database 250 may include a back-end performance database 252-BE and a front-end performance database 252-FE. It should be appreciated that over time, the size of performance database 250 may become extremely large and thus, inefficient. Since, AP selection program 212-P3 may only require aggregate information such as average and peak/best values for a given range of time-of-day and day-of-week over a moving window of time period, a compact database (e.g., front-end performance database 252-FE) may be configured to store aggregate information for each wireless AP. Back-end performance database 252-BE may store the raw performance metrics reported by the measurement programs P1 and the user experience input program 212-P2. Advantageously, by storing larger portions of raw received performance metrics in back-end performance database 252-BE, varied aggregation algorithms may be applied against the raw received performance metrics to produce entries for front-end performance database 252-FE. Moreover, the aggregation algorithms may be adjusted over time to improve estimated performance expectations.

In some embodiments, measurement programs P1 measure throughput over a short time period (for example, a few seconds), and report both peak and average throughput as well as best/shortest and average round trip time (RTT) for traffic in uplink and downlink directions respectively.

In some embodiments, performance database 250 may store aggregate information such as average and peak/best values.

In some embodiments, component interactions 266 or measurement reporting 264 is over an application level protocol. In some of these embodiments, the application level protocol uses either a TCP connection or an UPD connection.

In some embodiments, measurement reporting 264 are one-way communication.

In some embodiments, measurement programs P1 periodically sends measured performance metrics to the performance database.

In some embodiments, if a packet is lost on its way to the performance database (e.g., measurement reporting 264), then the information is simply not recorded at the performance database and no retransmission protocols are employed.

It should be appreciated that in the case where measurement server 240 contains performance database 250, measurement reporting 264-4 may simply be measurement server 240 storing the performance metrics in performance database 250.

In some embodiments, performance database 250 is co-located with one of client 210, wireless AP 220 or measurement server 240. It should be appreciated that when performance database 250 is co-located, measurement reporting 264 may not require traversing a network (e.g., network 130 of FIG. 1).

In some embodiments, signal strength and one-hop performance apply to a (client, wireless AP) pair; backhaul performance applies to a (wireless AP, measurement server) pair; and both end-to-end performance and end user experience rating apply to a (client, wireless AP, measurement server) tuple.

Advantageously, the client's IP address is not required to be used in the wireless AP selection process as performance statistics of clients associated to the wireless AP in the past provide the needed performance data.

In a first embodiment, performance database 250 stores the client's IP address when recording client related performance metrics (e.g., one-hop performance, end-to-end performance and end user experience rating). In some of these embodiments, when clients perform measurement retrieval 262, performance database 250 entries are modified as follows:

a. The one-hop performance statistics entry for a (client, wireless AP) pair with a given wireless AP and signal strength is converted into the one-hop performance metric for a (signal strength, wireless AP) pair.

b. The end-to-end performance statistics entry for a (client, wireless AP, measurement server) tuple with a given wireless AP and measurement server is converted into one entry for a (signal strength, wireless AP, measurement server) tuple.

c. The end user experience rating statistics entry for a (client, wireless AP, measurement server) tuple with a given wireless AP and measurement server is converted into one entry for a (signal strength, wireless AP, measurement server) tuple.

In a second embodiment, performance database 250 stores signal strength of the wireless AP observed by the client instead of IP address or device ID as identity of the client.

Advantageously, storing the performance metrics in performance database 250 using the pairs and tuples described herein and using the current signal strength as a representation of the client identifier allows simplified retrieval of historical performance metrics by a given wireless AP.

For example, client 210 may determine an identifier for wireless AP 220 and a signal strength of a wireless connection between itself and wireless AP 220 and then query performance database 250 via measurement retrieval 262 for historical performance metrics associated with the identifier of wireless AP 220 and the current signal strength. Performance database 250 may then query the database and retrieve historical performance metric records based on the (signal strength, wireless AP) pair and return the results raw results or aggregated results to client 210 via measurement retrieval 262.

In some embodiments, performance database 250 may include a time of day range or a day of the week in the database query. Advantageously, as link quality may differ based on the time of day or the day of the week, a query constrained by these factors may better approximate the current network conditions. In some of these embodiments, client 210 may include a time of day range or a day of the week in the query to performance database 250. In other of these embodiments, performance database 250 may base the query on current temporal conditions at the time of the query.

In some of these embodiments, the retrieved historical performance metrics may relate to a signal strength range based on the current signal strength instead of an absolute signal strength. The signal strength range may be any suitable range and may be determined by either performance database 250 or by client 210. In some of these embodiments, the signal strength range may be included by client 210 in the query to performance database 250.

In some embodiments, when client 210 is querying performance database 250 for end-to-end performance metrics, client 210 may include an identifier for the measurement server in the query to performance database 250. In some other embodiments for retrieving end-to-end performance metrics, client 210 will not be required to include the identifier of the measurement server in the query to the performance database. It should be appreciated that if there is only one measurement server associated with a given wireless AP for performing end-to-end measurements, the measurement server will be determinable based on the given wireless AP. In these embodiments, performance database 250 may then retrieve historical end-to-end performance metric records based on the (signal strength, wireless AP, measurement server) tuple.

In some embodiments, performance database 250 is configured as a centralized design. For example, one performance database may store information for all of the wireless APs in a wireless operator's network that subscribers of the wireless service provider are allowed to connect to in order to realize data offload from the cellular network to the network (e.g., network 130 of FIG. 1). In some of these embodiments, the list of available wireless APs may be based on an authentication process.

In some embodiments, performance database 250 is configured as a distributed design. For example, using multiple smaller databases, one performance database may store information for wireless APs in a geographical region.

In some embodiments, AP selection program 212-P3 is initiated by a wireless AP selection trigger. A wireless AP selection trigger may be any suitable event such as the determination that one or more wireless APs exist having a signal strength meeting a threshold or a determination that the signal strength of the current wireless connection has dropped below a threshold. For example, in an LTE implementation, the determination that one or more wireless APs exist may trigger AP selection program 212-P3 in order to implement a data offloading service of an LTE base station.

In some embodiments of AP selection program 212-P3, measurement retrieval 262 retrieves performance metrics for client 210 in response to a wireless AP selection trigger.

In some embodiments of AP selection program 212-P3, measurement retrieval 262 retrieves performance metrics for client 210 prior to a wireless AP selection trigger. In some of these embodiments, AP selection program 212-P3 retrieves and stores performance metrics regarding all wireless APs in a geographical region that covers the client's movement pattern. As the list of available APs in a region changes, user's movement pattern changes, and the performance of the APs change over time, client 210 may periodically retrieve updated performance metrics from performance database 250.

In some of these embodiments, the performance metrics are retrieved from the front-end performance database.

In some embodiments of AP selection program 212-P3, the distribution of performance metrics from performance database 250 to the clients (e.g., client 210) may follow either a pull or push approach. In the pull approach, the client periodically requests performance metrics from performance database 250. In the push approach, performance database 250 sends performance information to client 210 periodically or upon changes in the performance metrics.

Figure 3:
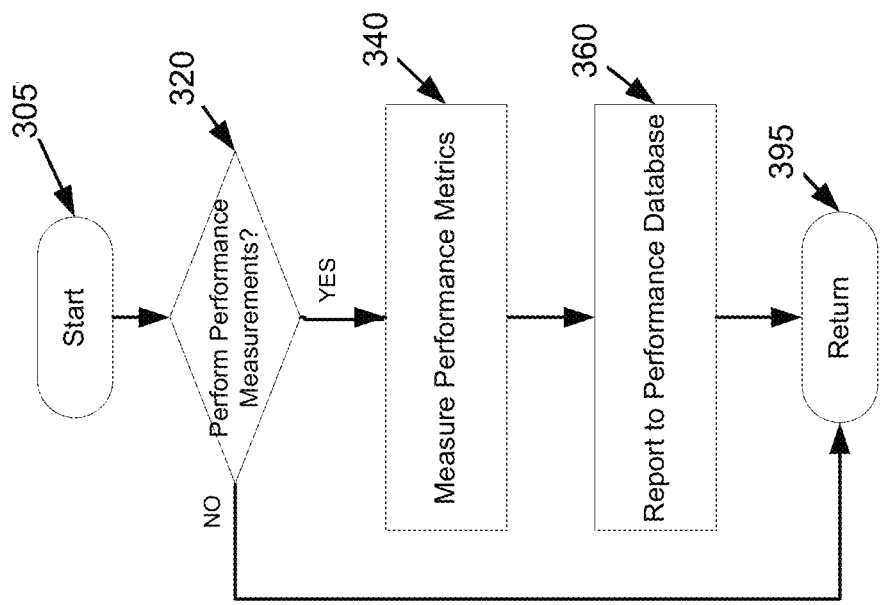
FIG. 3 depicts a flow chart illustrating an embodiment of a method 300 for an apparatus (e.g., client 210, wireless AP 220 or measurement server 240 of FIG. 2) to measure performance as illustrated in appropriate measurement programs P1 of FIG. 2.

FIG. 3 depicts a flow chart illustrating an embodiment of a method 300 for an apparatus (e.g., client 210, wireless AP 220 or measurement server 240 of FIG. 2) to measure performance as illustrated in appropriate measurement programs P1 of FIG. 2. The method includes upon determination that a performance measurement trigger has occurred (step 320), measuring performance metrics (step 340) and reporting the measured performance metrics to the performance database (e.g., performance database 250 in FIG. 2).

In the method 300, the step 320 includes determining that a performance measurement trigger has occurred. Based on the trigger determination, the method either proceeds to steps 340 if a trigger event is determined or returns (step 395). The trigger may be any suitable event signaling that performance metrics should be measured. For example, the trigger event may be: (a) periodically triggered at threshold intervals; (b) periodically triggered at threshold intervals when a client (e.g., client 110 of FIG. 1 or 210 of FIG. 2) is associated with a wireless AP (e.g., one of wireless APs 120 of FIG. 1 or 220 of FIG. 2); (c) a measurement request (e.g., an exchange of messages between any pair of client, wireless AP or measurement server); (d) at the start or end of an application session; (e) or the like. It should be appreciated that multiple trigger events may occur at the same time.

In the method 300, the step 340 includes measuring the performance metrics of communication between any pair of client, wireless AP or measurement server. In particular, the measuring apparatus (e.g., one of client 210, wireless AP 220 or measurement server 240 of FIG. 2) executes an appropriate measurement program (e.g., an appropriate one of measurement programs P1 of FIG. 2).

In the method 300, the step 360 includes reporting the performance metrics to the performance database (e.g., performance database 250 of FIG. 2). In particular, the measurement programs may report measured performance metrics periodically to the performance database (e.g., performance database 250 of FIG. 2).

In some embodiments of the step 320, the determination that a client is associated to a wireless AP may be via a message. For example, a measurement server may receive an explicit message from either the client or the wireless AP specifying the association or may implicitly imply that a client is associated based on the receipt of a message from the client over the wired network (e.g., network 130 of FIG. 1).

In some embodiments, the step 340 includes collecting performance metrics during varied times of the day and days of the week. It should be appreciated that performance of a wireless AP may vary based on traffic load and that traffic load may vary based on time-of-day and day-of-week patterns.

In a first embodiment of the step 340, the measurements of the performance metrics (e.g., link quality) is passive (i.e., the measurement program performs measurements during normal data operations). In particular, measurements may be conducted when a client (e.g., client 210 of FIG. 2) is associated with a wireless AP (e.g., wireless AP 220 of FIG. 2).

In a second embodiment of the step 340, the measurements of the performance metrics is active (i.e., the measurement program performs one or more tests).

In some embodiments of the step 360, the measurement program on the wireless AP or the client (e.g., measurement program 222-P1 212-P1 respectively of FIG. 2) may report data other than performance metrics. In some of these embodiments, the wireless AP signal strength is reported along with the performance metrics in order to correlate the wireless AP signal strength with link quality as described herein.

In some of the embodiments of the step 360, performance metrics may be stored for a period of time on the apparatus (e.g., client 210, wireless AP 220 or measurement server 240 of FIG. 2) and reported periodically to the performance database (e.g., performance database 250 of FIG. 2). For example, a number of performance metrics measured and stored over a period of time may be sent in bulk.

In some embodiments of the step 340, the measurement program (e.g., an appropriate one of measurement programs P1 of FIG. 2) measures performance metrics based on an apparatus pair (e.g., two of client 210, wireless AP 220 or measurement server 240 of FIG. 2).

In some embodiments, one-hop performance metrics related to communication between a client (e.g., client 210 of FIG. 2) and a wireless AP (e.g., wireless AP 220 of FIG. 2) are measured. In some of these embodiments, measured performance metrics regarding one-hop performance collected by the wireless AP or the measurement server include: round-trip time (RTT) for small packets, RTT for large packets, uplink throughput, or downlink throughput. The one-hop performance measurements may include passive or active measurements.

In some embodiments of the step 320, the performance measurement trigger may be periodically invoked when a client is associated with a wireless AP. It should be appreciated that since one-hop communication is over the wireless network the client must be associated with a wireless AP when the performance metrics are measured.

In some embodiments of the passive embodiment, the measurement program on the wireless AP (e.g., measurement program 222-P1 of FIG. 2) measures receiver throughput in the uplink direction, while the measurement program on the client (e.g., measurement program 212-P1 on FIG. 2) measures receiver throughput in the downlink direction.

In some embodiments of the active embodiment, the measurement programs (e.g., measurement program 222-P1 of FIG. 2) conduct one or more tests such as:

a. Ping test with large packet size and small packet size sent from the measurement program on the client to the measurement program on the wireless AP.

b. Ping test with large packet size and small packet size sent from the measurement program on the wireless AP to the measurement program on the client.

c. Uplink throughput test for uploading a test file using UDP from the measurement program on the client to the measurement program on the wireless AP.

d. Downlink throughput test for downloading a test file using UDP from the measurement program on the wireless AP to the measurement program on the client.

In some embodiments, backhaul performance metrics related to communication between a wireless AP (e.g., wireless AP 220 of FIG. 2) and a measurement server (e.g., measurement server 240 of FIG. 2) are measured. In some of these embodiments, measured performance metrics regarding backhaul performance collected by the wireless AP or the measurement server include: round-trip time (RTT) for small packets, RTT for large packets, uplink throughput, or downlink throughput. The wireless backhaul performance measurements may include passive or active measurements.

In some embodiments of the step 320, the performance measurement trigger may be periodically invoked whether a client is associated with the wireless AP or not. It should be appreciated that since backhaul performance measurements are over a wired network, there is no requirement for a client to be associated with the wireless AP when the performance metrics are measured.

In some embodiments of the passive embodiment, the measurement program on the wireless AP (e.g., measurement program 222-P1 on FIG. 2) measures receiver throughput in the downlink direction, while the measurement program on the measurement server (e.g., measurement program 242-P1 on FIG. 2) measures receiver throughput in the uplink direction.

In some embodiments of the active embodiment, the measurement programs (e.g., measurement programs P1 of FIG. 2) conduct one or more tests such as:

a. Ping test with large packet size and small packet size sent from the measurement program on the wireless AP to the measurement program on the measurement server.

b. Ping test with large packet size and small packet size sent from the measurement program on the measurement server to the measurement program on the wireless AP.

c. Uplink throughput test for uploading a test file using UDP from the measurement program on the wireless AP to the measurement program on the measurement server.

d. Downlink throughput test for downloading a test file using UDP from the measurement program on the measurement server to the measurement program on the wireless AP.

In some embodiments, end-to-end performance metrics related to communication between a client (e.g., client 210 of FIG. 2) and a measurement server (e.g., measurement server 240 of FIG. 2) are measured. In some of these embodiments, measured performance metrics regarding end-to-end performance measurements collected by the client or the measurement server include: round-trip time (RTT) for small packets, RTT for large packets, uplink throughput, or downlink throughput. The end-to-end performance measurements may include passive or active measurements.

In some embodiments of the step 320, the performance measurement trigger may be periodically invoked when a client is associated with a wireless AP. It should be appreciated that since end-to-end communication is over both the wireless network and a wired network the client must be associated with a wireless AP when the performance metrics are measured.

In some embodiments of the passive embodiment, the measurement program on the client (e.g., measurement program 212-P1 on FIG. 2) measures receiver throughput in the downlink direction, while the measurement program on the measurement server (e.g., measurement program 242-P1 on FIG. 2) measures receiver throughput in the uplink direction.

In some embodiments of the active embodiment, the measurement programs (e.g., measurement programs P1 of FIG. 2) conduct one or more tests such as:

a. Ping test with large packet size and small packet size sent from the measurement program on the client to the measurement program on the measurement server.

b. Ping test with large packet size and small packet size sent from the measurement program on the measurement server to the measurement program on the client.

c. Uplink throughput test for uploading a test file using UDP from the measurement program on the client to the measurement program on the measurement server.

d. Downlink throughput test for downloading a test file using UDP from the measurement program on the measurement server to the measurement program on the client.

It should be appreciated that the measurement programs may conduct any suitable test and that the above embodiments are illustrative and non-limiting. For example, measurement programs (e.g., measurement programs P1 of FIG. 2) may conduct other tests such as a throughput test using TCP or a jitter test.

Figure 4:
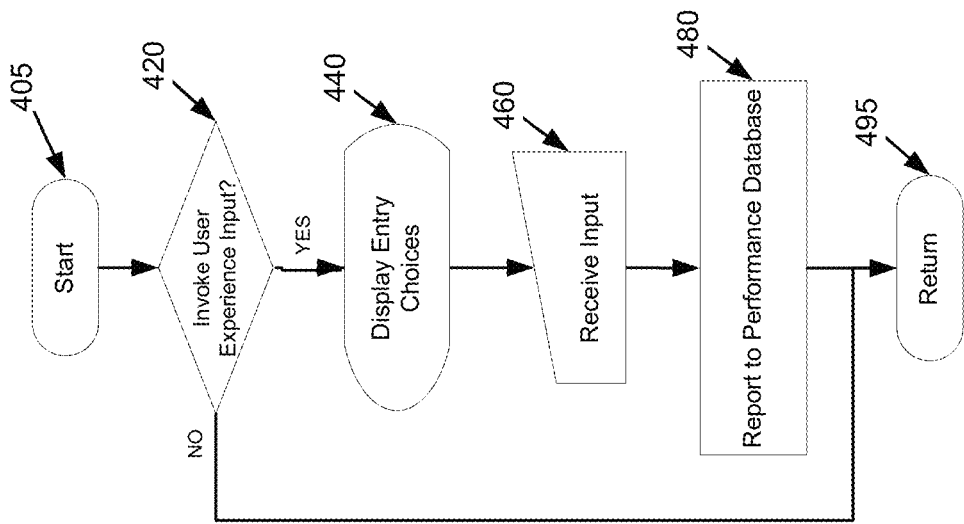
FIG. 4 depicts a flow chart illustrating an embodiment of a method 400 for a client (e.g., client 110 of FIG. 1 or client 210 of FIG. 2) to report user experience ratings as illustrated in user experience input program 212-P2 of FIG. 2.

FIG. 4 depicts a flow chart illustrating an embodiment of a method 400 for a client (e.g., client 110 of FIG. 1 or client 210 of FIG. 2) to report user experience ratings as illustrated in user experience input program 212-P2 of FIG. 2. The method includes determining to invoke the user experience input program (step 420), displaying user experience entry choices (step 440), receiving input selecting a user experience rating entry (step 460), and reporting to the performance database based on the user experience entry choice (step 480).

In the method 400, the step 420 includes determining to invoke the user experience input program. The user experience input program may be invoked by any suitable event such as: (a) automatically invoked at the conclusion of a communication session; (b) by detection of a user selection; (c) or the like. It should be appreciated that multiple events may occur at the same time.

In the method 400, the step 440 includes displaying a list of user experience rating choices to solicit a user's selection describing the user's experience with this wireless AP. In some of these embodiments the user experience rating choices are numbers (e.g., 1 to 5). In some of these embodiments the user experience rating choices are textual (e.g., excellent, good, average, fair, or poor).

In the method 400, the step 460 includes receiving input selecting a user experience rating entry. In particular, the client maps the inputted user experience rating for that client (e.g., client 110 of FIG. 1) with the wireless AP (e.g., one of wireless APs 120 of FIG. 1) that is currently associated with the client or had been most recently associated with the client.

In the method 400, the step 480 includes reporting to the performance database based on the user experience entry choice as described herein.

In some embodiments of the step 420, 440, or 460, a user is capable of invoking the user experience input API while the client is associated with a wireless AP or while selection thresholds are met. Selection thresholds may be any suitable threshold such as a threshold period of time after a client's associated with a wireless AP has been terminated. For example, if a user has not entered a user experience rating within a threshold time after a client (e.g., client 210 of FIG. 2) association with a wireless AP (e.g., wireless AP 220 of FIG. 2) has been terminated, the client will not allow a user to invoke the API or enter a user experience rating. In some of these embodiments, the client may display a "grayed out" or inactive icon when the client is not allowing the user to invoke the API or enter a user experience rating.

In some embodiments, a graphical user interface displays a user experience input icon for selection by a user (e.g., an icon to be invoked by clicking or tapping on the icon). In some of these embodiments, step 420 includes making the user experience input icon selectable (i.e., capable of being invoked) while the client is associated with a wireless AP or while selection thresholds are met.

In some of the embodiments of the step 480, user experience ratings may be stored for a period of time on the apparatus (e.g., client 210 of FIG. 2) and reported periodically to the performance database (e.g., performance database 250 of FIG. 2). For example, a number of user experience ratings received and stored over a period of time may be sent in bulk.

In some embodiments of the step 480, further information such as the time period that the client had been associated to the mapped wireless AP is sent with the inputted user experience rating and mapped wireless AP.

Figure 5:
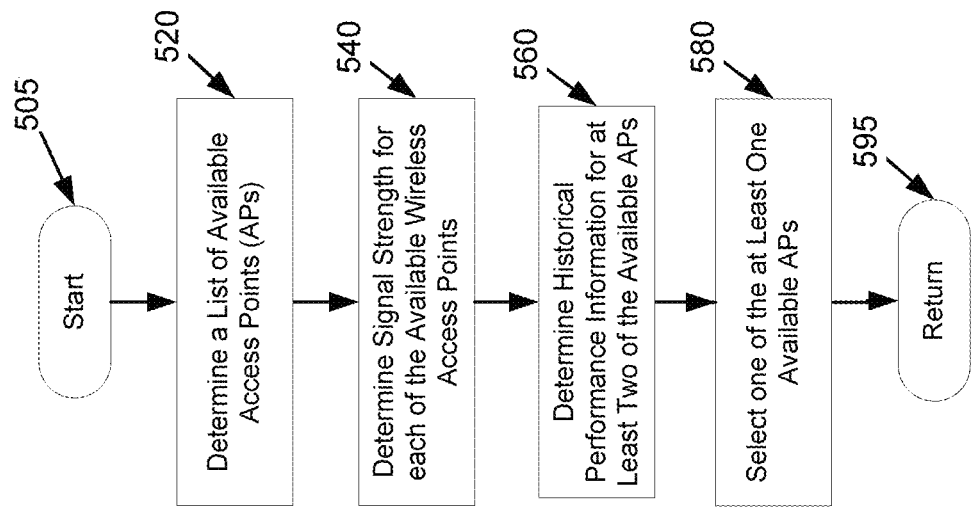
FIG. 5 depicts a flow chart illustrating an embodiment of a method 500 for a client (e.g., client 110 of FIG. 1 or client 210 of FIG. 2) to select a wireless AP as illustrated in user experience input program 212-P3 of FIG. 2.

FIG. 5 depicts a flow chart illustrating an embodiment of a method 500 for a client (e.g., client 110 of FIG. 1 or client 210 of FIG. 2) to select a wireless AP as illustrated in user experience input program 212-P3 of FIG. 2. The method includes determining a list of available wireless access points (step 520), determining signal strength for each of the available wireless access points (step 540), determining historical performance metrics associated with at least two of the available wireless access points (step 560), and selecting at least one of the available access points based on the determined performance information and signal strength (step 580).

In the method 500, the step 520 includes determining a list of available wireless APs. In particular, a list of wireless APs available for use by a client is determined. If a signal strength is not determined for a wireless AP in step 540, that wireless AP is not a member of the list of available wireless APs.

In the method 500, the step 540 includes determining signal strength for each of the available wireless access points.

In the method 500, the step 560 includes determining historical performance metrics associated with at least two of the available wireless access points. In particular, the apparatus performing the method retrieves the historical performance metrics associated with the at least two of the available wireless access points from a performance database (e.g., performance database 250) as described herein.

In the method 500, the step 580 includes selecting at least one of the available access points based on the determined historical performance metrics and current signal strength.

In some embodiments, the steps 520 and 540 are determined concurrently. For example, the list of available wireless APs may be determined by determining those wireless APs having a signal strength greater than or equal to a threshold signal strength. In some of these embodiments, the threshold signal strength may be a signal strength greater than zero (0).

In some embodiments of the step 560, the historical performance information is based on the specific time of day range or the day of the week.

In some of these embodiments, the specific time of day range is a range of a threshold time from the current time. For example, recent historical performance metrics that were measured within a threshold time (e.g., within the last 15 minutes) may be used. It should be appreciated that the AP selection of step 580 may be based on performance metrics reported within a threshold time by other clients associated with the target available wireless AP since these recent past performance metrics may be indicative of current performance metrics of the target available wireless AP.

In some embodiments of the step 560, the historical performance information includes performance metrics. In some of these embodiments, the performance metrics include one-hop, backhaul, or end-to-end performance metrics.

In some embodiments of the step 560, the historical performance information includes historical user experience ratings.

In some embodiments, step 560 or 580 includes basing the determination on a current time-of-day-range and a day-of-week. In some of these embodiments, the selection is based on historical performance information during a current time-of-day-range or a day-of-week.

In some embodiments of the step 560 or 580, different selection algorithms or different subsets of historical performance metrics may be used.

It should be appreciated that all of the available wireless access points may not have complete associated historical performance metrics stored in the performance database. For example, newly installed wireless APs may not have any performance records stored in the performance database, there may not be recently stored performance metrics associated with one or more wireless APs, and wireless APs without a measurement program (e.g., measurement program 222-P1 of FIG. 2) may not have all available historical performance metrics stored in the performance database (e.g., backhaul performance metrics).

In some embodiments of step 580 using different selection algorithms, the selection algorithm may be based on the subset of historical performance information returned in step 560. For example, if some or all of the wireless APs do no have backhaul performance metrics, an algorithm may be selected that does not use backhaul performance metrics. In a second example, if performance metrics are not available for a time of day range, the time of day range may be increased or performance metrics for another time of day may be used. To this second example, if recent historical performance metrics (e.g., within a time threshold) are available, those recent reported measurements may be used, but if recent historical performance metrics are not available, historical performance metrics may be based on a larger time threshold or performance measurements reported during a time of day range for previous day(s).

In some embodiments of step 580, the selection algorithm may estimate missing performance metrics. For example, if the determined historical performance metrics includes backhaul performance metrics for a first wireless AP but does not include backhaul performance metrics for a second wireless AP, step 580 may estimate the backhaul performance metrics for the second wireless AP to be the same as the first wireless AP, estimate the backhaul performance metrics of the second wireless AP based on environmental conditions or set the backhaul performance metric of the second wireless AP to default value(s).

In some embodiments, the step 580 includes using a selection algorithm that maximizes a performance metric. For example, an algorithm selecting the maximum average throughput.

In some embodiments, the step 580 includes using a selection algorithm that requires a performance metric to meet a threshold. For example, an algorithm requiring an average throughput greater than or equal to a threshold or a round trip delay less than or equal to a threshold.

In a first embodiment, step 580 includes using a selection algorithm including a (current signal strength, historical user experience rating) pair. In some of these embodiments, the selection is based on the wireless AP with current signal strength above certain threshold Ts, and a maximum historical user experience rating for the wireless AP. In some of these embodiments, the selection is based on the wireless AP with a maximum current signal strength and historical user experience rating above a threshold Tr.

In a second embodiment, step 580 includes using a selection algorithm including a (current signal strength, historical end-to-end performance) pair. In some of these embodiments, the selection is based on the wireless AP with a current signal strength above certain threshold Ts, and a maximum historical end-to-end performance for the wireless AP where the measurement is reported. In some of these embodiments, the selection is based on a maximum signal strength and historical end-to-end performance above a certain threshold Te.

In a third embodiment, step 580 includes using a selection algorithm including a (current signal strength, historical backhaul performance). In some of these embodiments, the selection is based on the wireless AP with current signal strength above certain threshold Ts, and a maximum historical backhaul performance for the AP. In some of these embodiments, the selection is based on the wireless AP with a maximum signal strength and historical backhaul performance above a certain threshold Tb.

In a fourth embodiment, step 580 includes using a selection algorithm including a (current signal strength, historical one-hop performance). In some of these embodiments, the selection is based on the wireless AP with a current signal strength above certain threshold Ts, and a maximum historical one-hop performance for the AP where the measurement is reported when the client's signal strength is above Ts. In some of these embodiments, the selection is based on the wireless AP with a maximum signal strength and historical one-hop performance above a threshold To.

In a fifth embodiment, step 580 includes using a selection algorithm including a (current signal strength, historical one-hop performance, historical backhaul performance) tuple. In some of these embodiments, the selection is based on the wireless AP with a current signal strength above a threshold Ts, and a maximum value of (Po+Pb), where Po is the historical one-hop performance for the wireless AP where the measurement is reported when the client's signal strength is above Ts, and Pb is the historical backhaul performance for the AP. In some of these embodiments, the selection is based on the wireless AP with a maximum signal strength and the sum (Po+Pb), above a threshold Tob, where Po is the historical one-hop performance for the wireless AP, where the measurement is reported when the client's signal strength is above Ts, and Pb is the historical backhaul performance for the wireless AP.

In a sixth embodiment, step 580 further includes basing the selection algorithm of the second-fifth embodiment on user experience ratings. In some of these embodiments, the algorithms may be modified by adding a user experience rating threshold Tr as follows. The set of wireless APs considered must have a historical user experience rating above a certain threshold Tr.

Referring to FIGS. 1 and 3, an example of selecting a wireless AP is given. In step 520, client 110 may determine that wireless APs 120-1, 120-2 and 120-4 are available. In step 540, client 110 may determine that the signal strengths are SignalStrength(1), SignalStrength(2) and SignalStrength (3) respectively. In step 560, client 110 may query performance database 150 for one-hop performance metrics for (signal strength, wireless AP) pairs, and retrieve historical performance metrics of AvgThroughput(1), AvgThroughput (2), and AvgThroughput(3) respectively. In step 580, client 110 may then select wireless AP 120-2 based on a determination that AvgThroughput(2) is the highest historical average throughput of the wireless APs and that SignalStrength(2) exceeds a minimum threshold signal strength.

Although primarily depicted and described in a particular sequence, it should be appreciated that the steps shown in methods 300, 400 and 500 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

FIG. 6 schematically illustrates an embodiment of various apparatus 600 such client 110, one of wireless APs 120 or measurement server 140 of FIG. 1 or client 210, wireless AP 220 or measurement server 240 of FIG. 2. The apparatus 600 includes a processor 610, a data storage 611, and an I/O interface 630.

The processor 610 controls the operation of the apparatus 600. The processor 610 cooperates with the data storage 611.

The data storage 611 may store program data. The data storage 611 also stores programs 620 executable by the processor 610.

The processor-executable programs 620 may include an I/O interface program 621, a measurement program 623, a user experience input program 625, or an AP selection program 627. Processor 610 cooperates with processor-executable programs 620.

The I/O interface 630 cooperates with processor 610 and I/O interface program 621 to support communications over appropriate one or more of communications channels 115, 125, or 145 of FIG. 1 as described above.

The measurement program 623 performs the steps of method(s) 300 of FIG. 3 as described above.

The user experience input program 625 performs the steps of method 400 of FIG. 4 as described above.

The AP selection program 627 performs the steps of method 500 of FIG. 5 as described above.

In some embodiments, the processor 610 may include resources such as processors/CPU cores, the I/O interface 630 may include any suitable network interfaces, or the data storage 611 may include memory or storage devices. Moreover the apparatus 600 may be any suitable physical hardware configuration such as: one or more server(s), blades consisting of components such as processor, memory, network interfaces or storage devices. In some of these embodiments, the apparatus 600 may include cloud network resources that are remote from each other.

In some embodiments, the apparatus 600 may be virtual machine. In some of these embodiments, the virtual machine may include components from different machines or be geographically dispersed. For example, the data storage 611 and the processor 610 may be in two different physical machines.

When processor-executable programs 620 are implemented on a processor 610, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for selecting a wireless access point, the apparatus comprising:
    a data storage; and
    a processor communicatively connected to the data storage, the processor being configured to:
    determine a plurality of wireless access points available to the apparatus;
    determine a plurality of signal strengths, the plurality of signal strengths comprising signal strengths between the apparatus and each of the plurality of available wireless access points;
    determine a plurality of historical performance metrics associated with at least two of the plurality of available wireless access points;
    select the wireless access point from the plurality of wireless access points based on the plurality of historical performance metrics and the plurality of signal strengths;
    associate the apparatus with the selected wireless access point;
    measure a one-hop performance metric between the apparatus and the selected wireless access point;
    measure an end-to-end performance metric between the apparatus and a measurement server; and
    report the one-hop performance metric and the end-to-end performance metric to a performance database;
    wherein the plurality of historical performance metrics comprise metrics based on at least one of:
        one or more backhaul performance measurements; and
        one or more end-to-end performance measurements.

2. The apparatus of claim 1, wherein the plurality of historical performance metrics are based on a current time of day range or a day of the week.

3. The apparatus of claim 1, wherein the determination of the plurality of historical performance metrics comprises configuring the processor to:
retrieve the plurality of historical performance metrics from the performance database.

4. The apparatus of claim 1, wherein the plurality of historical performance metrics comprise the one or more backhaul performance measurements.

5. The apparatus of claim 4, wherein the plurality of historical performance metrics comprise one or more historical user experience ratings.

6. The apparatus of claim 4, wherein the plurality of historical performance metrics are based on a plurality of (signal strength, wireless AP) pairs, wherein the (signal strength, wireless AP) pairs correspond to a plurality of current signal strengths between the apparatus and each of the plurality of wireless access points.

7. The apparatus of claim 4, wherein the plurality of historical performance metrics are based on a plurality of (signal strength, wireless AP, measurement server) tuples, wherein the (signal strength, wireless AP, measurement server) tuples correspond to a plurality of current signal strengths between the apparatus and each of the plurality of wireless access points.

8. The apparatus of claim 6, wherein the selection of the wireless access point comprises configuring the processor to:
select the wireless access point based on the wireless access point having an associated maximum performance metric in the plurality of historical performance metrics.

9. A method for selecting a wireless access point, the method comprising:
at a processor communicatively connected to a data storage, determining a plurality of wireless access points available to an apparatus;
determining, by the processor in cooperation with the data storage, a plurality of signal strengths, the plurality of signal strengths comprising signal strengths between the apparatus and each of the plurality of wireless access points;
determining, by the processor in cooperation with the data storage, a plurality of historical performance metrics associated with at least two of the plurality of available wireless access points;
selecting, by the processor in cooperation with the data storage, the wireless access point from the plurality of wireless access points based on the plurality of historical performance metrics and the plurality of signal strengths;
associating, by the processor in cooperation with the data storage, the apparatus with the selected wireless access point;
measuring, by the processor in cooperation with the data storage, a one-hop performance metric between the apparatus and the selected wireless access point;
measuring, by the processor in cooperation with the data storage, an end-to-end performance metric between the apparatus and a measurement server; and
reporting, by the processor in cooperation with the data storage, the one-hop performance metric and the end-to-end performance metric to a performance database;
wherein the plurality of historical performance metrics comprise metrics based on at least one of:
one or more backhaul performance measurements; and
one or more end-to-end performance measurements.

10. The method of claim 9, wherein the step of determining the plurality of historical performance metrics comprises:
retrieving, by the processor in cooperation with the data storage, the plurality of historical performance metrics from the performance database.

11. The method of claim 9, wherein the plurality of historical performance metrics comprise the one or more backhaul performance measurements.

12. The method of claim 9, wherein the plurality of historical performance metrics comprise one or more historical user experience ratings.

13. The method of claim 9, wherein the plurality of historical performance metrics are based on a plurality of (signal strength, wireless AP) pairs, wherein the (signal strength, wireless AP) pairs correspond to a plurality of current signal strengths between the apparatus and each of the plurality of wireless access points.

14. The method of claim 9, wherein the plurality of historical performance metrics are based on a plurality of (signal strength, wireless AP, measurement server) tuples, wherein the (signal strength, wireless AP, measurement server) tuples correspond to a plurality of current signal strengths between the apparatus and each of the plurality of wireless access points.

* * * * *